US006996103B1

(12) United States Patent
Franco

(10) Patent No.: US 6,996,103 B1
(45) Date of Patent: Feb. 7, 2006

(54) METHOD AND SYSTEM FOR MULTICASTING

(75) Inventor: Guillermo Antonio Franco, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 902 days.

(21) Appl. No.: 09/885,905

(22) Filed: Jun. 20, 2001

(51) Int. Cl.
*H04L 12/28* (2006.01)
*H04L 12/56* (2006.01)

(52) U.S. Cl. .................... 370/390; 370/432; 370/395.1
(58) Field of Classification Search ................ 370/390, 370/395.1, 432, 60, 229, 389, 392, 401, 412–416, 370/428
See application file for complete search history.

(56) References Cited

U.S. PATENT DOCUMENTS

| | | | | |
|---|---|---|---|---|
| 5,361,256 A | * | 11/1994 | Doeringer et al. .......... | 370/390 |
| 6,101,180 A | | 8/2000 | Donahue et al. ............ | 370/352 |
| 6,101,187 A | * | 8/2000 | Cukier et al. ............... | 370/396 |
| 6,262,982 B1 | | 7/2001 | Donahue et al. ............ | 370/352 |
| 6,266,339 B1 | | 7/2001 | Donahue et al. ............ | 370/432 |
| 6,389,027 B1 | | 5/2002 | Lee et al. .................... | 370/401 |
| 6,411,616 B1 | | 6/2002 | Donahue et al. ............ | 370/352 |
| 6,502,140 B1 | | 12/2002 | Boivie ........................ | 709/238 |
| 6,611,510 B2 | | 8/2003 | Famolari et al. ............ | 370/335 |
| 6,647,020 B1 | | 11/2003 | Maher et al. ................ | 370/432 |
| 6,654,371 B1 | * | 11/2003 | Dunstan et al. ............. | 370/390 |
| 6,754,224 B1 | | 6/2004 | Murphy ...................... | 370/432 |
| 6,831,918 B1 | | 12/2004 | Kavak .................... | 370/395.52 |
| 6,834,326 B1 | | 12/2004 | Wang et al. ................. | 711/114 |
| 6,839,348 B2 | * | 1/2005 | Tang et al. .................. | 370/390 |
| 6,865,167 B2 | | 3/2005 | Famolari et al. ............ | 370/331 |
| 6,865,617 B2 | | 3/2005 | Zeidner et al. ................ | 710/3 |
| 2003/0142672 A1 | | 7/2003 | Chen et al. .................. | 370/390 |

* cited by examiner

*Primary Examiner*—Ajit Patel
(74) *Attorney, Agent, or Firm*—Baker Botts L.L.P.

(57) ABSTRACT

A method for transmitting data to multiple destinations includes storing a data portion in association with a current destination and a next destination. The method also includes (a) transmitting a copy of the data portion to the current destination, (b) updating the current destination to be the next destination and updating the next destination to be a new next destination, and (c) after updating, storing the current destination and the next destination in association with the stored data portion. The method repeats steps (a), (b), and (c) at least one time.

24 Claims, 3 Drawing Sheets

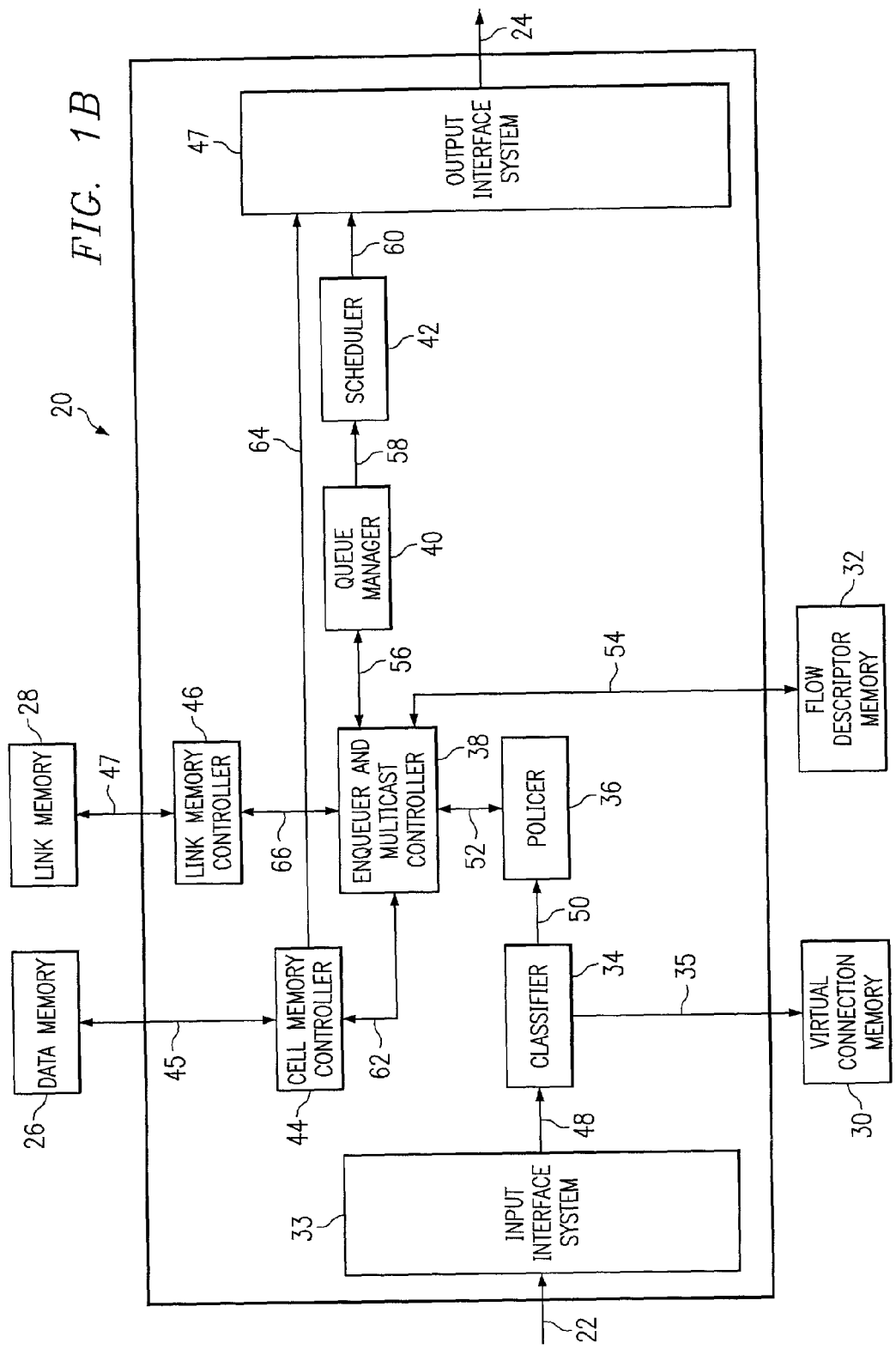

METHOD AND SYSTEM FOR MULTICASTING

TECHNICAL FIELD OF THE INVENTION

The present invention relates generally to the field of telecommunications, and more particularly to a method and system for multicasting.

BACKGROUND OF THE INVENTION

Data communications is becoming increasingly important in today's society. Many media exists for transmitting data, including the airways, cable, and telephone lines. As technology develops, these types of media may be used in new ways. For example, video data, such as television, has traditionally been transmitted over either cable or the airways. However, technology enhancements may allow such transmissions to occur in a viable fashion over telephone lines. One problem associated with transmitting video over telephone lines is addressing how to transmit data to multiple locations, referred to herein as multicasting.

One format for communicating data is asynchronous transfer mode (ATM) format. Many other formats exist. According to one prior technique, an ATM switch addresses multicasting by identifying a data cell as a multicast cell and then making multiple copies of the cell. The multiple copies are stored in memory and transmitted at an appropriate time to each destination. A problem with this approach is the large amount of memory required to store multiple copies of the same data. In addition, writing multiple copies of data is time consuming and contributes to switch latency.

Another approach for addressing multicasting of data involves storing the associated data only once in memory. A pointer associated with each destination is stored that points to the stored data. This approach avoids having to store the same data numerous times. However, in this approach it is difficult to determine when to clear the data cell from memory. To do so conventionally requires a counter for each cell that keeps track of what pointers require the data. Storing such a counter is undesirable because of the large associated memory requirements. This problem is particularly acute where a given destination receives more than one type of communication, such as Internet data, telephone access, and television broadcasts. The multiple types of transmissions multiplies the number of possible destinations and thus increases the required size of each counter, further contributing to additional memory requirements.

SUMMARY OF THE INVENTION

Therefore, a need has arisen for a method and system for multicasting. The present invention provides a method and system for multicasting that addresses disadvantages of prior systems and methods.

According to one embodiment of the invention, a method for transmitting data to multiple destinations includes storing a data portion having a current destination in association with a next destination tag. The next destination tag is indicative of a next destination for the data portion. The method also includes (a) transmitting a copy of the data portion to the current destination, (b) updating the current destination to be the next destination and updating the next destination tag to have the value of a new next destination tag that is indicative of a new next destination, and (c) after updating, storing the next destination tag in association with the stored data portion. The method repeats steps (a), (b), and (c) at least one time.

According to another embodiment of the invention, a system for transmitting data to multiple destinations includes a data memory and a multicast control table. The multicast control table associates a current tag with a next tag. The current and next tags are associated with destinations for a data portion received by the system. The system also includes an enqueuer and multicast controller. The enqueuer and multicast controller is operable to assign a first tag to the received data portion. The first tag identifies a second destination for the data portion. The enqueuer and multicast controller is also operable to initiate storing of the data portion and the first tag in memory and determine, based on the first tag in the multicast control table, a second tag that identifies a third destination for the data portion. The enqueuer and multicast controller is also operable to initiate storage of the second tag in association with the stored data portion.

Embodiments of the invention provide a number of technical advantages. Embodiments of the invention may include all, some, or none of these advantages. A technical advantage of one embodiment is that multiple destinations may receive the same transmission without requiring writing the data multiple times in a switch memory. By avoiding writing data multiple times, not only is memory space conserved but the time required to write the data is reduced, which reduces switch latency. In addition, according to one embodiment of the invention, a counter need not be maintained for each destination in order to determine when buffer memory may be cleared, i.e. when all destinations have been sent the data.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which:

FIG. 1B is a block diagram showing an ATM switch of the central office of FIG. 1A according to the teachings of the invention;

DETAILED DESCRIPTION OF EXAMPLE EMBODIMENTS OF THE INVENTION

Example embodiments of the present invention and their advantages are best understood by referring now to FIGS. 1A through 3 of the drawings, in which like numerals refer to like parts.

Figure 1A:
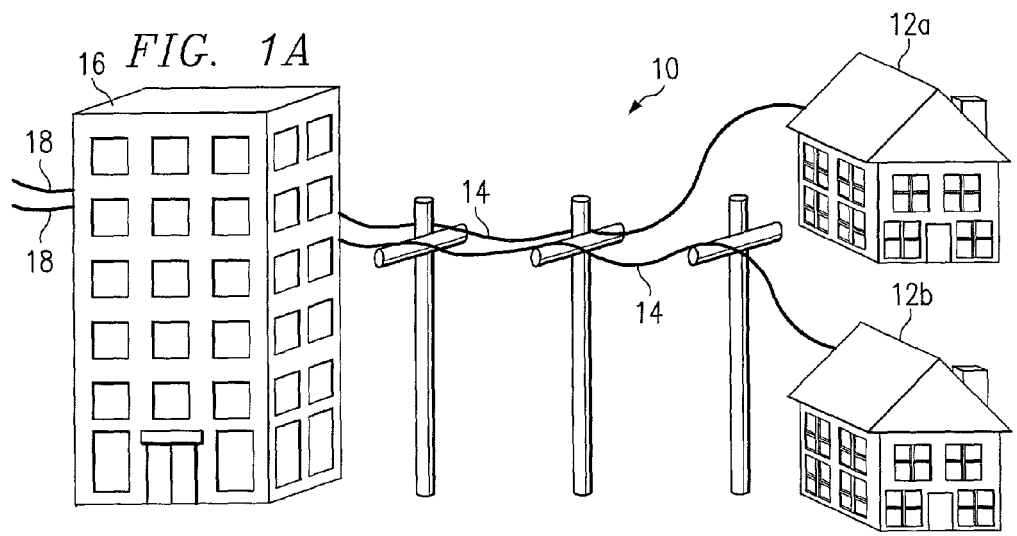
FIG. 1A is a schematic diagram showing a communication system that may utilize the teachings of the present invention.

FIG. 1A is a schematic diagram showing a telecommunications system 10 that may utilize the teachings of the invention. Telecommunications system 10 includes a plurality of customer homes 12a, 12b connected to a telecommunications central office 16 through a plurality of telephone wires 14. Central office 16 may in turn couple homes 12a and 12b to an Internet backbone 18, a media source (not explicitly shown), or other source or destination of information.

Telecommunications system 10 therefore allows communication of data between homes 12a and 12b in locations remote from homes 12a and 12b (not explicitly shown) through Internet backbone 18. As described in greater detail below, central office 16 includes an asynchronous transfer mode (ATM switch) that effects switching of data received for transmission to homes 12a and 12b, as well as switching of data received from homes 12a and 12b to other destinations.

Often times it is desirable for both homes 12a and 12b to receive the same data transmission received over Internet backbone 18, media source (not explicitly shown), or other originating locations. Transmission of the same data to multiple locations is referred to herein as multicasting. According to the teachings of the invention, an ATM switch and method are provided that address multicasting, as described in greater detail below.

FIG. 1B is a block diagram of ATM switch 20 that may reside in central office 16, or other suitable location. FIG. 1B also illustrates a data memory 26, a link memory 28, a virtual connection memory 30, and a flow descriptor memory 32, each associated with switch 20. ATM switch 20 receives data, as denoted by reference numeral 22, and eventually transmits the data to desired locations, as denoted by reference numeral 24.

ATM switch 20 includes a plurality of components for receiving data cells, temporarily storing the data cells, and transmitting the data cells to a desired destination. These components include, in this embodiment, an input interface 33, a classifier 34, a policer 36, an enqueuer and multicast controller 38, a queue manager 40, a scheduler 42, a cell memory controller 44, a link memory controller 46, and an output interface system 47. Each of these components is described in greater detail below.

These components may communicate with each other through electrical links, or links through other components (not explicitly shown). Example suitable links include data bases, simple conductors, and intermediate components. These links are identified here as follows. Input interface system 33 communicates with classifier 34 through link 48. Classifier 34 communicates with policer 36 through link 50. Enqueuer and multicast controller 38 communicates with policer 36 through link 52. Enqueuer and multicast controller 38 accesses flow descriptor memory 32 over link 54. Classifier 34 accesses virtual connection memory over link 35. Queue manager 40 communicates with enqueuer multicast controller 38 through link 56 and communicates with scheduler 42 over link 58. Enqueuer and multicast controller communicates with cell memory controller 44 through link 62 and link memory controller 46 over link 66. Cell memory controller 44 communicates with data memory 26 over link 45 and link memory controller 46 communicates with link memory 28 over link 47. Data cells are transmitted out of ATM switch 20 through output interface system 47. These cells are received from cell memory controller 44 over link 64.

Input interface system receives data cells originating external of ATM switch 20. These data cells are then provided to classifier 34 over link 48. Classifier 34 identifies the origin of the cell and the type of cell. For example, classifier 34 examines the header of the received cell and the physical interface (a portion of input interface system) on switch ATM from which the cell was received and determines a tag to assign the cell based on this information. Tags are described in greater detail below, but generally reference information that describes what should be done with the data. Classifier 34 assigns the determined tag to the received cell and transmits the two to policer 36. Classifier 34 may also perform other classification functions such as identifying the cell as video, audio, etc. Classifier 34 may determine the appropriate tag by accessing virtual control memory 30. Virtual connection memory 30 stores data associating a given tag with a particular data source. For example, virtual connection memory 30 may store a list that designates that "Video Channel 5" should receive a tag of "100." In this example, "100" represents an address in a multicast linked list 70, a linked list (FIG. 2B) stored in enqueuer and multicast controller 38 that maintains additional memory addresses associated with each destination that should receive "Video Channel 5," as described in greater detail below. In one example, virtual connection memory 30 may be SDRAM; however, other types of memory may be used.

Policer 36 determines whether the particular type of cell is allowed according to an associated service contract. The result of the classification and policing functions is provided to enqueuer 38 over link 52.

Enqueuer and multicast controller 38 examines the tag assigned by classifier 34 to determine what to do with the data cell, including whether the data cell is intended for more than one destination (a multicast cell). This determination may include accessing flow descriptor memory 32, which associates a given tag with a particular destination and provides header information for that destination. Enqueuer and multicast controller 38 also function in cooperation with queue manager 40 to generate a sequence of addresses to be stored in a queue in link memory 28 designating the order and location of stored cells in data memory 26 for later retrieval. Link memory controller controls reading and writing these addresses to link memory 28. Queue manager 40 communicates the sequence of addresses corresponding to stored data for storing in link memory 28 to link memory controller 46. Scheduler 60 communicates with queue manager 40 at an appropriate time to initiate retrieval of data as needed.

Cell memory controller controls reading and writing of data to data memory 26. Data memory 26 temporarily stores data transmitted through switch 20.

According to the teachings of the invention, when a data cell is identified as multicast cell, enqueuer and multicast controller 38 generates a flow control tag for the cell. The flow control tag includes a next tag associated with a next destination for the cell and a flag indicating a subsequent destination exists. The data cell, including a header and the flow control tag is stored in data memory 26. Upon transmission of that data cell to the first desired destination, the stored next tag in the flow control tag is read by enqueuer and multicast controller 38. At that time enqueuer and multicast controller 38 generates a new header and new flow control tag for the data cell and stores that header and flow control tag in data memory 26 in conjunction with the already stored data portion. The new header is appropriate for the new destination, and the current destination for the stored cell may be stored by use of appropriate queues well known in the art, such as through use of link memory 28 and queue manager 40. The new flow control tag includes a new next tag, indicating the next destination after the current one to which data will be sent, as well as a flag indicating a subsequent destination exists.

By writing only a new header and new flow control tag and not the associated data payload, switch latency is reduced. Additional memory requirements are not imposed because the data payload is stored only once. However, counters for each data payload need not be maintained because the flag in the flow control tag indicates when no additional destination exist, as described in greater detail below, which reduces memory requirements. Additional details associated with one embodiment of the invention are described in greater detail in conjunction with FIGS. 2A through 3.

Figure 2A:
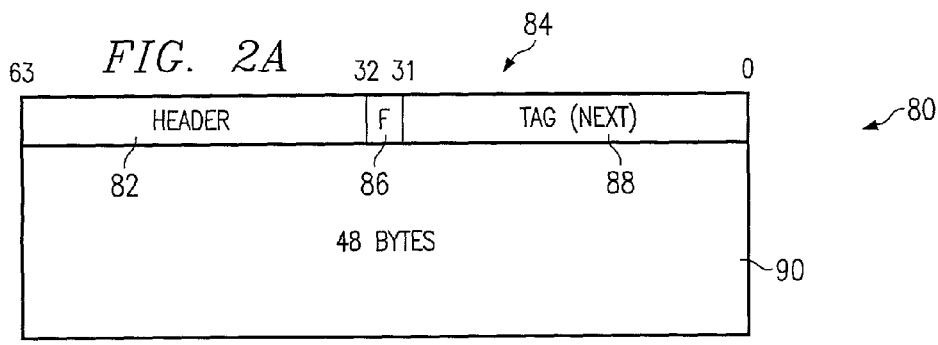
FIG. 2A is a schematic diagram showing portions of one example of a data cell.

FIG. 2A is a schematic diagram illustrating a multicast data cell 80 according to the teachings of the invention. Multicast data cell 80 includes a header 82, a flow control tag 84, and a data payload 90. Header 82, is stored, in this example, in the second four bytes of multicast data cell. Flow control tag 84 includes a multicast flag 86 and a next tag 88. Multicast flag 86 designates whether there is a destination subsequent to the current one for data cell 80. Next tag 88 stores an address in multicast linked list 70 associated with the next destination for multicast data cell 80, if any. Payload section 90 stores the data portion of the multicast data cell, and in this embodiment may comprise up to 48 bytes of data.

Figure 2B:
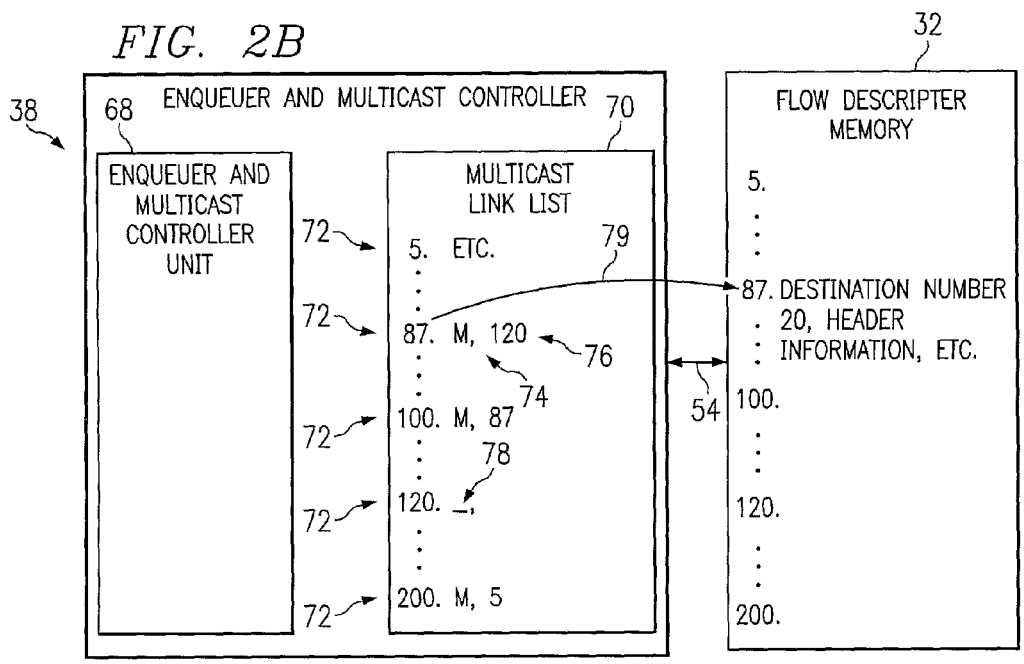
FIG. 2B is a block diagram of the enqueuer and multicast controller and flow descriptor table of FIG. 1A, showing additional details of the enqueuer and multicast controller and the flow descriptor table.

FIG. 2B is a block diagram of enqueuer and multicast controller 38 and flow descriptor memory 32 showing additional details of the enqueuer and multicast controller and the flow descriptor memory. Enqueuer and multicast controller 38 includes an enqueuer and multicast controller unit 68 and a multicast linked list 70. Enqueuer and multicast controller unit 68 contains logic operable to perform the functions of enqueuer and multicast controller 38. This logic may be implemented through firmware or through software. Multicast linked list 70 is a linked list that stores addresses associated with a plurality of destinations that will receive a particular multicast set of data.

Multicast linked list 70 comprises a plurality of addresses 72. Each address may be accessed by a pointer of the same number, such as in the flow control tag. At each address a flag 74 and a next tag 76 is stored. Flag 74 indicates whether additional destinations for a particular data cell are present. Next tag 76 provides the address in multicast linked list associated with the next destination that will receive the multicast data cell.

Operation of multicast linked list 70 is described here with reference to the example shown in FIG. 2B. Multicast linked list may be accessed through a pointer to, for example, address "100." The flag "M" indicates that the current data cell is intended for at least one additional destination. The value "87" stored at address location "100" designates a next tag of "871" that is associated with the next destination for the multicast data cell. At address location "87" the flag 74 is set, indicating additional destinations exist for the multicast data cell. The data value "120" designates a next tag associated with another destination for the multicast data cell. At address location "120," the multicast flag is not set, as denoted by reference numeral 78. This indicates that the last destination for the multicast data cell is associated with address number "120."

In addition to determining addresses in multicast link memory that are associated with next destinations, the next tags in multicast linked list also provide an index to flow descriptor table, which stores information important to delivery of the data cell, such as destination, header information, location and size of the queue in which the data will be indexed, the priority of the data, and quality of service, as denoted by reference numeral 79.

A provisioning controller (not explicitly shown) may maintain and modify multicast linked list 70 in response to requests from users for a particular service, such as requesting "Channel 5." In doing so, provisioning controller determines an available tag and associates it with the requesting destination.

As described in greater detail below, multicast linked list 70 is utilized by enqueuer and multicast controller unit 68 to appropriately modify the "next tag" that is written to data memory in conjunction with the stored data cell.

Figure 3:
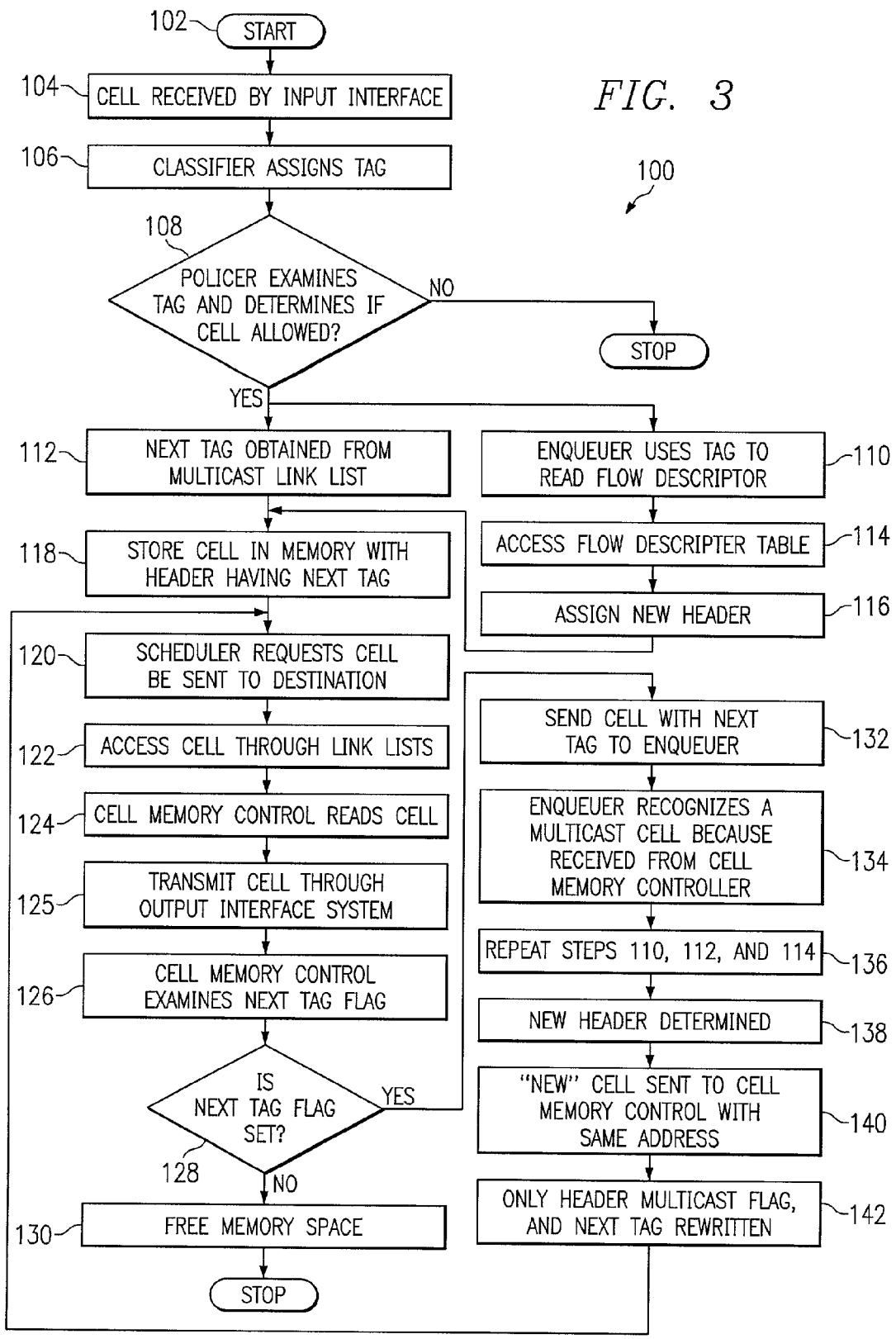
FIG. 3 is a flowchart illustrating example steps associated with multicasting according to the teachings of the invention.

FIG. 3 is a flowchart illustrating a method for multicasting data to a plurality of destinations according to one embodiment of the invention. The method is described with reference to FIGS. 1B through 3. The method begins at step 102. At a step 104 a data cell is received by input interface system 33 of ATM switch 20. After transferring the received data cell to classifier 34 over link 48, classifier 34 assigns a tag to the data cell at step 106. According to one embodiment, classifier 34 assigns the tag based on the header of the cell received from input interface system 33 and the location within input interface system 33 from which the cell arrived. To do so, classifier 34 may access virtual connection memory 30. Virtual connection memory 30 may store associations between a particular type of multicast data, such as data corresponding to channel 5 of a television station, and the associated destinations. In one example, a data cell is received by classifier 34 whose header indicates it is associated with "Channel 5" virtual connection memory 30 provides a tag corresponding to an address that begins a linked list (stored in multicast linked list 70) containing all users of "Channel 5."

At a step 108, policer 36 examines the tag assigned by classifier 34 and determines whether the cell is allowed. If the cell is not allowed, the cell is rejected and processing concludes. If the cell is allowed, processing continues at steps 110 and 112, which may take place concurrently.

At step 110, enqueuer and multicast controller 38 examines the tag supplied by classifier 34. The information associated with the particular tag number is 115 stored in a flow descriptor table 32. Information stored in flow descriptor memory 32 may include a user destination number, the associated cell header for the user destination number, and other information. Accessing flow descriptor table may be performed at step 114. Based on accessing flow descriptor table a new header is assigned to the multicast data cell at step 116. This header identifies the destination for which the data cell is intended and includes appropriate header information.

Concurrent with step 110, a next tag for the multicast data cell is obtained at step 112. This may be performed, in one embodiment, by accessing multicast linked list 70. This next tag and the assigned new header obtained at steps 116 are stored in conjunction with the data cell in cell memory at step 118. The stored cell may take substantially the form of multicast data cell 80, illustrated in FIG. 2B.

At step 120, at an appropriate time, scheduler 42 requests that the stored data cell be sent to the current destination for the data cell. In response, queue manager 40, enqueuer and multicast controller 38, cell memory controller 44 and link memory controller 46 cooperate to access the stored data cell in data memory utilizing linked lists in link memory 28 at step 122. In this example, queue manager 40 provides the appropriate address to cell memory controller 44. At step 124, cell memory controller 44 reads the stored data cell from data memory 26. At step 125, the data cell is transmitted through output interface system 47 to the current destination. At step 126, cell memory controller 44 examines the next tag flag 86 that is stored in the data cell. At a step 128 a determination is made of whether the next tag flag is set. If the next tag flag is not set, the memory space in which the data cell is stored in data memory 26 is freed, allowing writing of other data to that location at step 130. If the next tag flag is set, processing continues at step 132.

At step 132, the data cell is also sent to enqueuer and multicast controller 38 by cell memory controller 44 in response to determining that the next tag flag was set. At step 134, enqueuer and multicast controller 38 recognizes that the received multicast cell was received from cell memory controller 44. Therefore, enqueuer and multicast controller 38 knows that the received data cell is already stored in data memory 26 and requires updating for a subsequent destination only of its header, multicast flag, and next tag. At step 136, processing continues as normal as if the data cell was received originally at enqueuer and multicast controller 38 from classifier 34 and had not been previously stored in data memory 26. This processing includes steps 110, 112, and 114. At a step 138, a new header is determined for the same data already stored in data memory 26, but for a different destination. At a step 140, enqueuer and multicast controller 38 instructs cell memory controller 44 to write a "new" cell in data memory 26 for storage. However, as indicated at step 142, only the header, multicast flag, and next tag are written. The original data payload 90 is simply retained. Processing continues at step 120 until no next tag flag is set, as determined at step 128. Processing then concludes at step 144.

By rewriting only the header, multicast flag, and next tag at step 144 rather than the data payload, writing time is reduced and switch latency is diminished. Furthermore, according to the teachings of the invention, counters are not required for each stored data cell to determine when a location in data memory is free for writing.

Although embodiments of the invention and their advantages are described in detail, a person skilled in the art could make various alterations, additions, and omissions without departing from the spirit and scope of the present invention as defined by the appended claims.

What is claimed is:

1. A method for transmitting data to multiple destinations comprising:
storing a data portion having a current destination in association with a next destination tag, the next destination tag indicative of a next destination for the data portion;
(a) transmitting a copy of the data portion to the current destination;
(b) updating the current destination to be the next destination and updating the next destination tag to have the value of a new next destination tag, the new destination tag indicative of a new next destination;
(c) after updating, storing the next destination tag in association with the stored data portion; and
repeating steps (a), (b), and (c) at least once.

2. The method of claim 1, wherein updating the next destination tag comprises assessing a table associating the next destination tag with the new next destination tag.

3. The method of claim 2, wherein the table is a multicast control table.

4. The method of claim 1, wherein storing a data portion in association with a next destination tag comprises storing an ATM cell having a header and a flow control tag.

5. The method of claim 4, wherein storing the updated next destination in association with the stored data portion comprises modifying the flow control tag.

6. The method of claim 1, wherein the data portion is the data payload of an ATM cell.

7. The method of claim 4, and further comprising storing a flag in the flow control tag, the flag indicative of whether additional destinations for the data portion exist.

8. A method for transmitting data to multiple destinations comprising:
receiving a data portion;
determining a first destination for the data portion;
assigning a first tag to the data portion, the first tag identifying a second destination for the data portion;
storing the data portion and the first tag in memory;
reading the data portion and tag from memory and transmitting the data portion to the first destination;
determining, based on the first tag, a second tag that identifies a third destination for the data portion; and
storing the second tag in association with the stored data portion;
wherein assigning a first tag to the data portion comprises associating the first destination with the first tag; and
wherein the list comprises an entry having a multicast flag and the subsequent destination, the entry indexed by the current destination.

9. The method of claim 8, wherein receiving a data portion comprises receiving an ATM cell at an ATM switch.

10. The method of claim 9, wherein the ATM cell has a header, and wherein determining a first destination for the data portion comprises determining by a classifier in an ATM switch, a first destination for the data portion and wherein the first tag is assigned based on the header of the ATM cell.

11. The method of claim 8, wherein associating the first destination with the first tag comprises accessing a list associating a current destination for the data portion with a subsequent destination for the data portion.

12. The method of claim 8, wherein the first destination is represented by a memory address.

13. The method of claim 8, wherein storing the data portion and the first tag in memory comprises storing the first tag as part of a header of the data portion.

14. The method of claim 8, wherein determining, based on the first tag, a second tag that identifies a third destination for the data portion comprises accessing a multicast link table.

15. The method of claim 8, wherein the first destination is represented by a memory address.

16. The method of claim 8, wherein storing the second tag in association with the stored data portion comprises writing the second tag over the stored first tag.

17. A system for transmitting data to multiple destinations comprising:
a data memory;
a multicast control table associating a current tag with a next tag, the current and next tags associated with destinations for a data portion received by the system;
an enqueuer and multicast controller operable to:
assign a first tag to the received data portion, the first tag indicative of a second destination for the data portion;
initiate storing of the data portion and the first tag in memory;
determine, based on the first tag and the multicast control table, a second tag that identifies a third destination for the data portion; and
initiate storage of the second tag in association with the stored data portion.

18. The system of claim 17, and further comprising a classifier operable to receive the data portion and determine a first destination for the data portion.

19. The system of claim 17, and further comprising a buffer system mediating communication between the enqueuer and multicast controller and data memory.

20. The system of claim 17, wherein the multicast control table is stored in SSRAM.

21. The system of claim 17, wherein the received data portion comprises an ATM cell.

22. The system of claim 17, wherein the multicast control table further comprises a multicast flag indicating subsequent destinations exist for the received data portion.

23. A method for transmitting data to multiple destinations comprising:
    receiving a data portion;
    determining a first destination for the data portion;
    assigning a first tag to the data portion, the first tag identifying a second destination for the data portion;
    storing the data portion and the first tag in memory;
    reading the data portion and tag from memory and transmitting the data portion to the first destination;
    determining, based on the first tag, a second tag that identifies a third destination for the data portion;
    storing the second tag in association with the stored data portion;
    wherein receiving a data portion comprises receiving an ATM cell at an ATM switch; and
    wherein the ATM cell has a header, and wherein determining a first destination for the data portion comprises determining by a classifier in an ATM switch, a first destination for the data portion and wherein the first tag is assigned based on the header of the ATM cell.

24. A method for transmitting data to multiple destinations comprising:
    receiving a data portion;
    determining a first destination for the data portion;
    assigning a first tag to the data portion, the first tag identifying a second destination for the data portion;
    storing the data portion and the first tag in memory;
    reading the data portion and tag from memory and transmitting the data portion to the first destination;
    determining, based on the first tag, a second tag that identifies a third destination for the data portion;
    storing the second tag in association with the stored data portion; and
    wherein storing the second tag in association with the stored data portion comprises writing the second tag over the stored first tag.

* * * * *